United States Patent
Gilliard et al.

(10) Patent No.: US 6,682,795 B1
(45) Date of Patent: Jan. 27, 2004

(54) MULTILAYER HOLLOW BODY

(75) Inventors: Pierre Gilliard, Brussels (BE); Jules-Joseph Van Schaftingen, Wavre (BE)

(73) Assignee: Solvay (Societe Anonyme), Brussels (BE)

( * ) Notice: Subject to any disclaimer, the term of this patent is extended or adjusted under 35 U.S.C. 154(b) by 256 days.

(21) Appl. No.: 09/615,839

(22) Filed: Jul. 13, 2000

(30) Foreign Application Priority Data

Jul. 19, 1999 (BE) ............................................. 09900494

(51) Int. Cl.⁷ ............................. B32B 1/02; B32B 27/36
(52) U.S. Cl. ..................... 428/36.6; 428/36.7; 428/480; 428/483
(58) Field of Search ................................ 428/36.6, 36.7, 428/480, 483

(56) References Cited

U.S. PATENT DOCUMENTS

| | | | |
|---|---|---|---|
| 5,129,544 A | | 7/1992 | Jacobson et al. ........... 220/562 |
| 5,150,812 A | * | 9/1992 | Adams ........................ 220/414 |
| 5,707,691 A | | 1/1998 | Plester et al. ............... 427/472 |
| 5,873,860 A | * | 2/1999 | Kahlert ....................... 604/217 |
| 5,928,745 A | * | 7/1999 | Wood et al. ............... 428/36.6 |
| 6,146,764 A | * | 11/2000 | Suokas et al. .............. 428/412 |
| 6,328,842 B1 | * | 12/2001 | Coninck et al. .......... 156/304.2 |

OTHER PUBLICATIONS

Patent Abstracts of Japan; vol. 1998, No. 8, Jun. 30, 1998 & JP 10 080463 A (Terumo Corp), Mar. 31, 1998 * Abstract *.

Patent Abstracts of Japan; JP 05 220784 A (Tokan Kogyo Co Ltd), Aug. 31, 1993 * Abstract *.

* cited by examiner

*Primary Examiner*—Sandra M. Nolan
(74) *Attorney, Agent, or Firm*—Larson & Taylor PLC

(57) ABSTRACT

Multilayer hollow body made of plastic, especially a fuel tank, having at least two molded multilayer parts welded together to form a multilayer hollow body having a hollow portion formed by a multilayer wall, each of the multilayer parts comprising at least one thermoplastic non-barrier layer and at least one barrier layer which may be comprised of a liquid-crystal polymer (LCP).

4 Claims, No Drawings

MULTILAYER HOLLOW BODY

The present invention relates to a multilayer hollow body made of a thermoplastic material, which is impermeable to liquids and/or to gases.

Hollow bodies, particularly tanks used at the present time for storing liquids and/or gases often consist essentially of plastic because of weight, mechanical strength, chemical resistance and easy processibility reasons, particularly when they have complex external shapes.

Plastic tanks are widely used in motor vehicles, where they are employed for containing various fluids: brake fluids, liquids for washing windscreens and headlights, and various fuels (diesel, petrol, LPG gas).

It is often imperative, for motor-vehicle applications, to ensure that the tanks on board are impermeable, particularly in the case of fuel tanks.

Various techniques are known for impermeabilizing the surfaces of plastic articles. Two different approaches have led to solutions being proposed which have been employed in processes for manufacturing these articles. The first is based on the surface treatment of the article by means of a plasma or by means of a chemical reactant, such as sulphur dioxide or fluorine gas, which is capable of modifying the molecules of the plastic which lie at the surface of the article. Another approach consists in sandwiching, into the thickness of the plastic of which the article is composed, a layer comprising a specific material, often thermoplastic, having a barrier property with respect to one or more gases or liquids. In the latter case, co-extrusion processing techniques have been widely employed.

As barrier material, it is common practice to use fluorinated polymers, polyamides, polyacrylo-nitriles, polyesters and polyvinylidene halides. However, these barrier materials are not always completely effective for all the types of gases or liquids with which they come into contact. This is why work has been carried out to find barrier products which are more effective then those mentioned above. Liquid-crystal polymers (LCP) were proposed so as to be able to achieve almost complete impermeability over a wide range of gases and liquids.

Patent Application JP-09/76380—A discloses a container for storing frozen food products which can also be used for the preparation of microwave-oven food, which has gas-barrier properties and consists of plastic bilayer shells having a rim. The container is manufactured by injection-moulding an internal layer made of a structural plastic chosen from polyethylene, polypropylene, polyethylene terephthalate, polybutylene terephthalate and polycarbonate, and by overmoulding an external layer made of LCP. The rim has a welding surface made of structural plastic.

However, these known containers are small in size and poorly suited to industrial or motor-vehicle environments. In addition, their lifetime is generally very short and often does not exceed a few months. Beyond this period, they rapidly lose their barrier properties.

The object of the present invention is to provide hollow bodies which are impermeable to liquids or gases, are of various sizes, which may include large hollow bodies, which are robust and retain their mechanical and barrier properties over many years under severe environmental conditions, such as tanks used for storing fuel, particularly fuel tanks of internal combustion engines such as, for example, the tanks on board of motor vehicles.

For this purpose, the invention relates to a thermoplastic multilayer hollow body obtained by welding at least two moulded hollow parts together and at least one layer of which comprises a barrier material, in which the layer comprising a barrier material is an inner layer which comprises at least one liquid-crystal polymer (LCP).

The expression "multilayer hollow bodies" should be understood to mean a hollow body whose walls are formed from a stack of at least two layers of different materials.

The term "fuel" should be understood to mean any liquid or gaseous product or composition which can be used as a fuel and/or an oxidizer for supplying an internal combustion engine or a fuel cell.

The hollow bodies according to the invention are made of thermoplastic, that is to say a plastic which, under the influence of heat, melts or softens sufficiently to allow it to be formed. The term "thermoplastic" should be understood to mean any thermoplastic polymer, including thermoplastic elastomers, as well as blends thereof. The term "polymer" should be understood to mean both homopolymers and copolymers (especially binary or ternary copolymers). Examples of such copolymers are, non-limitingly: random copolymers, alternating copolymers, block copolymers and graft copolymers.

The thermoplastic of one particular layer may be the only one in the multilayer structure of the hollow body. It may also be found in at least two separate layers of this structure. In either situation, a particular thermoplastic may be by itself or in the presence of other compounds chosen from additives of a wide variety of types, these being intended to modify the intrinsic properties of the thermoplastic and being well known to those skilled in the art. Examples of such additives are non-limitingly: fillers, stabilizers, plasticizers, lubricants, UV screens, etc. It is also possible to combine at least two different thermoplastics within a single layer of the structure. In this case, the layer may also possibly contain at least one of the abovementioned additives.

The hollow bodies according to the invention are impermeable to liquids and to gases; in other words, they have the ability to be able to retain the liquids and the gases in contact with their surface and to stop these materials migrating through their mass. In this case, the hollow bodies are impermeable to the gases and the aqueous or organic liquids liable to come into contact with them. Among the liquids, possibly including an inorganic or organic solute, are water, aliphatic and alicyclic alcohols, hydrocarbons and, in particular, petrol fuels for internal combustion engines and diesel fuel for diesel engines. Among the gases commonly encountered mention may be made of air, oxygen, carbon dioxide and fuel vapours. Several different liquids and/or gases as a mixture may also come in to contact with the articles to be impermeabilized.

According to the invention, the hollow body is obtained by welding at least two moulded hollow parts.

The term "welding" should be understood to mean the operation of joining at least two articles together, which comprises a melting step carried out at least over one portion of the surface of each article, a step of bringing the articles into contact with each other and a final step of cooling the molten material back down to the solid state for the purpose of obtaining a composite assembly of articles which behaves, from the mechanical standpoint, as a single article.

The "hollow part" refers to any part or article whose surface has at least one empty or concave portion. In particular, it refers to plastic shells which can be butt-welded.

The moulding technique used for manufacturing the hollow parts may be any moulding technique well known per se in the field of manufacturing plastic articles. For example, it may consist of injection moulding, compression moulding, injection-compression moulding; blow moulding or moulding by thermoforming. The term "injection moulding" should be understood to mean a moulding technique consisting in introducing molten plastic under pressure into a mould until the closed volume defined by the mould is completely filled, in cooling in order to set the hollow body and then in opening and removing the mould. As regards the technique of compression moulding, this consists in depositing plastic in an open mould and then in closing the mould and applying pressure for the time necessary to form the article which is then demoulded after the mould is opened. The technique of injection-compression moulding consists firstly in injecting plastic into an open mould and then in closing the mould and applying pressure, as in the technique of compression moulding. The technique of blow moulding consists in deforming a plastic article by pressure on the walls of a mould due to the action of a pressurized gaseous composition. Finally, the technique of moulding by thermoforming consists in impressing a permanent deformation on a plastic article by the action of heat. The technique of injection moulding has given good results.

The term "barrier material" should be understood to mean a material impermeable to liquids and gases, and in particular polymeric barrier resins.

According to the invention, the layer comprising a barrier material includes at least one liquid-crystal polymer.

The term "liquid-crystal polymer" (LPC) should be understood to mean a polymer whose molecules are in a fluid and ordered state over a range of temperatures intermediate between those which correspond to the solid state and those which correspond to the completely disordered melt (thermotropic polymer) or else a polymer capable of existing in the ordered state in solution (lyotropic polymer).

Preferably, the LCP used in the process according to the invention belongs to the class of thermotropic polymers. Such polymers generally comprise stretched chains or an alternation of rigid units and flexible units.

Examples of such polymers are given in the work "Encyclopedia of Polymer Science and Engineering", published by John Wiley & Sons, New York, 1987, Vol. 9, pages 1 to 61 and, in particular, the polyesters in Table 12 (pages 50 and 51) and Table 13 (page 52).

The preferred LCP polymers are p-hydroxybenzoic acid/ 6-hydroxy-2-naphthoic acid copolyesters and p-hydroxybenzoic acid/terephthalic acid/4,4'-biphenol copolyesters which are commercially available, for example the copolyesters of trademark VECTRA® and XYDAR®.

Most particularly preferred are the LCP polymers, particularly those mentioned in the previous paragraph, which are capable of forming thin films (thickness$\leq$0.030 mm and preferably$\leq$0.020 mm).

According to the invention, the layer comprising a barrier material is an inner layer. The term "inner layer" should be understood to mean both the layer in direct contact with the fluid, the outermost layer of the multilayer wall of the hollow body and lying on the inside of this hollow body, and any internal layer of this wall, which is only in contact with other layers of the structure, to the exclusion of any atmospheric fluid or content in the hollow body.

The hollow bodies according to the invention are suitable for producing containers or pipes or hoses whose permeability to liquids and gases is extremely low.

In particularly, they are well suited for mounting on a motor vehicle. They are most particularly suitable as petrol or diesel tanks for motor vehicles. They may also serve for the manufacture of impermeable accessories with which these tanks are to be equipped. As tank accessories, mention maybe made, non-limitingly, of: filling hoses, fuel-transporting lines, fuel gauges and fuel pumps, canisters intended for containing a composition retaining fuel vapours, valves of various types etc.

The invention also relates to a process for manufacturing a hollow body in accordance with the abovementioned hollow bodies according to the invention.

For this purpose, the invention relates to a process for manufacturing a multilayer hollow body made of thermoplastic and impermeable to liquids and/or gases, which process comprises the following steps:

in a first step, a barrier film comprising an LCP is deposited in a concave portion of a mould for producing a hollow part, the said film having an area at least equal to that of the concave surface of the mould, a convex portion of the mould is positioned above the film and the mould is closed, so as to impress on the film a shape corresponding to that of the hollow part to be manufactured;

in a second step, the barrier film is overmoulded inside the mould by injecting a structural thermoplastic via at least one injection nozzle located on the concave portion side of the mould, so as to cover the layer of barrier film with an outer layer of structural thermoplastic, cooling is applied, the mould is opened and the hollow part thus obtained is removed from the mould;

the above operations are repeated so as to obtain at least two hollow parts;

in a final step, the hollow parts are welded together so as to obtain a hollow body.

The term "hollow part" has the same meaning here as already explained above.

In this process, the barrier film employed was obtained in a prior process, different from the process according to the invention. Commercially available barrier films comprising an LCP are very suitable.

According to one particular process in accordance with the invention, the barrier film is a multilayer film which comprises at least one layer of LCP and at least one layer of adhesive The expression "layer of adhesive" should be understood to mean a layer which comprises at least one adhesive.

The nature of the adhesive may vary widely from one hollow part to another, as long as this adhesive remains compatible with the other constituents of the hollow part with which it is brought into contact and does not cause the mechanical properties of the entire multilayer structure to be degraded significantly.

As an example of adhesive, mention may be made of those described in French Patent Application 98/03571 in the name of Solvay.

The adhesive most widely employed is a polymer adhesive in the form of a functionalized polyolefin. The expression "functionalized polyolefin" should be understood to mean any polyolefin comprising, apart from units derived from olefins, functional monomeric units. The latter may be incorporated either into the main chamber of the polyolefin or into its side chains. They may also be incorporated directly into the backbone of these main and side chains, for example by the copolymerization of one or more functional monomers with the olefin monomers or else they may result from the grafting of one or more functional monomers on to the said chains, after the manufacture of the polyolefin. Several functionalized polyolefins may also be used as a blend.

The functional monomeric units of the functionalized polyolefin may be chosen from carboxylic acid, dicarboxylic acids and the anhydrides corresponding to these diacids.

These monomeric units generally come from the copolymerization or from the grafting of at least one unsaturated monomer possessing the same functional groups. Example of monomers that can be used are, non-limitingly: acrylic acid, methacrylic acid, maleic acid, fumaric acid, itaconic acid, maleic anhydride, fumaric anhydride and itaconic anhydride. Preferably, the functional monomeric units come from the copolymerization or the grafting of maleic anhydride, The invention also relates to an alternative process for manufacturing a hollow body as defined above.

According to this alternative process, the following operations are carried out:

- in a first step, a hollow part made of structural thermoplastic is manufactured by moulding a thermoplastic, opening the mould and removing the part from the mould;
- in a second step, the concave surface of the demoulded part is then coated, by painting, by means of a barrier material comprising an LCP;
- the above operations are repeated so as to obtain at least two coated hollow parts;
- in a final step, the coated hollow parts are welded together so as to obtain a hollow body.

The term "painting" should be understood to mean any process of coating a solid surface with a material capable of completely covering it and thus of isolating it from the external atmosphere, the material being dispersed in a fluid which is removed at the end of the coating process. By extension, the term "paint" also denotes the composition containing this material dispersed in the fluid.

According to a first way of implementing the alternative process according to the invention, the coating is carried out by applying a liquid paint comprising an LCP in solution to the concave surface of the demoulded hollow part. After coating it, the hollow part undergoes a drying operation.

According to a second way of implementing the alternative process according to the invention, the coating is carried out by applying to the concave surface of the demoulded hollow part a paint in dry powder form comprising an LCP, dispersed in a gas, which is sprayed onto the surface of the part leaving the mould.

As a variant to the above alternative process, in its first or its second method of implementation, a layer of adhesive is applied to the inside of the mould, before demoulding the hollow part, by over moulding over the structural thermoplastic.

The layer of adhesive and the nature of the adhesives are in accordance with those explained above in the case of the overmoulding of a barrier film by the structural material.

What is claimed is:

1. A hollow body for fuel tank or fuel tank accessory for a motor vehicle, said fuel tank comprising:
   at least two melded multilayer parts welded together to form a multilayer hollow body having a hollow portion formed by a multilayer wall, each of said multilayer parts comprising at least one thermoplastic non-barrier layer and at least one barrier layer, said barrier layer comprising a material different than the material of the non-barrier layer; and consisting essentially of at least one liquid-crystal polymer, said barrier layer forming an inner layer being selected from the group consisting of (a) a layer in direct contact with any fluid lying inside the hollow body and (b) an internal layer of the multilayer wall where the internal layer is only in contact with other layers of the multilayer wall to the exclusion of any atmospheric fluid or contents in the hollow body.

2. Hollow body according to claim 1, wherein the liquid-crystal polymer is chosen from p-hydroxybenzoic acid/6-hydroxy-2-naphthoic acid copolyesters and p-hydroxybenzoic acid/terephthalic acid/4,4'-biphenol copolyesters.

3. The multilayer hollow body of claim 1 wherein the barrier material comprises a barrier layer of less than or equal to 0.03 mm.

4. The multilayer hollow body of claim 2 wherein the barrier material comprises a barrier layer of less than or equal to 0.03 mm.

* * * * *